Aug. 31, 1954 O. LA V. DUPY ET AL 2,687,668

APPARATUS FOR DUPLICATING MOTION-PICTURE SHOTS

Filed Oct. 17, 1949 8 Sheets-Sheet 1

OLIN LAVERNE DUPY
RICHARD HENRI DUVAL
INVENTORS

BY Lyon & Lyon

ATTORNEYS

OLIN LAVERNE DUPY
RICHARD HENRI DUVAL
INVENTORS
BY Lyon & Lyon
ATTORNEYS

Aug. 31, 1954 O. LA V. DUPY ET AL 2,687,668

APPARATUS FOR DUPLICATING MOTION-PICTURE SHOTS

Filed Oct. 17, 1949 8 Sheets-Sheet 3

OLIN LAVERNE DUPY
RICHARD HENRI DUVAL
INVENTORS

BY Lyon & Lyon

ATTORNEYS

Aug. 31, 1954 O. LA V. DUPY ET AL 2,687,668

APPARATUS FOR DUPLICATING MOTION-PICTURE SHOTS

Filed Oct. 17, 1949 8 Sheets-Sheet 4

OLIN LAVERNE DUPY
RICHARD HENRI DUVAL
INVENTORS

BY Lyon & Lyon
ATTORNEYS

APPARATUS FOR DUPLICATING MOTION-PICTURE SHOTS

Filed Oct. 17, 1949

8 Sheets-Sheet 5

OLIN LAVERNE DUPY
RICHARD HENRI DUVAL
INVENTORS

BY Lyon & Lyon

ATTORNEYS

OLIN LAVERNE DUPY
RICHARD HENRI DUVAL
INVENTORS

BY Lyon & Lyon
ATTORNEYS

OLIN LAVERNE DUPY
RICHARD HENRI DUVAL
INVENTORS

BY Lyon & Lyon

ATTORNEYS

APPARATUS FOR DUPLICATING MOTION-PICTURE SHOTS

Filed Oct. 17, 1949 8 Sheets-Sheet 8

OLIN LAVERNE DUPY
RICHARD HENRI DUVAL
INVENTORS

BY Lyon & Lyon
ATTORNEYS

Patented Aug. 31, 1954 2,687,668

UNITED STATES PATENT OFFICE 2,687,668

APPARATUS FOR DUPLICATING MOTION-PICTURE SHOTS

Olin La Verne Dupy, Los Angeles, and Richard Henri Duval, Hawthorne, Calif., assignors to Loew's Incorporated, a corporation of Delaware Application October 17, 1949, Serial No. 121,883

7 Claims. (Cl. 88—16)

This invention relates to the production of motion pictures and is particularly directed to an apparatus for moving a motion picture camera in a predetermined path.

An important object of this invention is to provide an apparatus for controlling pan and/or tilt movements of motion picture apparatus so that the apparatus may be moved through an exact sequence of motions any number of desired times, permitting far and near objects to be photographed on the same film at different times while preserving a desired registry of the images on successive frames of the film.

Another object is to provide an apparatus of this type wherein the motion picture apparatus may be moved through any desired sequence of motions about a pan and/or tilt axis while a record of the sequence of motions is automatically produced, which record may then be used for causing the apparatus to be moved through the same path and sequence of motions any number of times.

This invention finds particular usefulness in connection with a moving shot duplicating system to permit recording in registry on the same film two separate shots taken at different times with the camera moving about the pan or tilt axis, or both, so that composite photographs made up of separate images in registry appear on each film frame.

Another object is to provide novel apparatus for use in such a duplicating system which is capable of very accurate control.

A further object of our invention is to provide apparatus by which the matt, or composite picture process of motion picture photography, may be adapted to be carried out with a camera that may be tilted and panned.

The matt process is well known in the art for still pictures. It comprises, in general, masking desired portions of the field in such a manner that shots of various components of a scene may be made at different times using the same film so as to produce a composite picture. For example, a first shot may be made of certain objects on a full size set, such as actors, furniture, portions of a building etc., with the upper portion of the field masked off. A second shot, but with the lower portion masked off, using the same film, will then be made of a painting or miniature, such as buildings, the sky, clouds, etc., to form a background. The developed picture will then present a composite of the two scenes such as to create the illusion that the full size set and the background were photographed at the same time. In some cases the matt is dispensed with and the complete frame may be exposed during each shot, the separate images being superposed in making the composite picture.

The process presents no particular difficulties if the camera is stationary when the shots are made. However, when it is attempted to make a moving shot of the successive components, two difficulties present themselves. First, the panning and tilting motions of the camera during the first shot must be exactly duplicated in the second or successive shots. Secondly, provision must be made to prevent relative motion between stationary objects of the respective components in the successive frames of the film. Our invention is directed toward the solution of both of these difficulties, as will hereinafter be illustrated.

A further object is to provide a new and improved apparatus for use in such a duplicating system which gives superior results to that heretofore obtainable.

Other and more detailed objects and advantages will appear more fully hereinafter.

Figure 1:
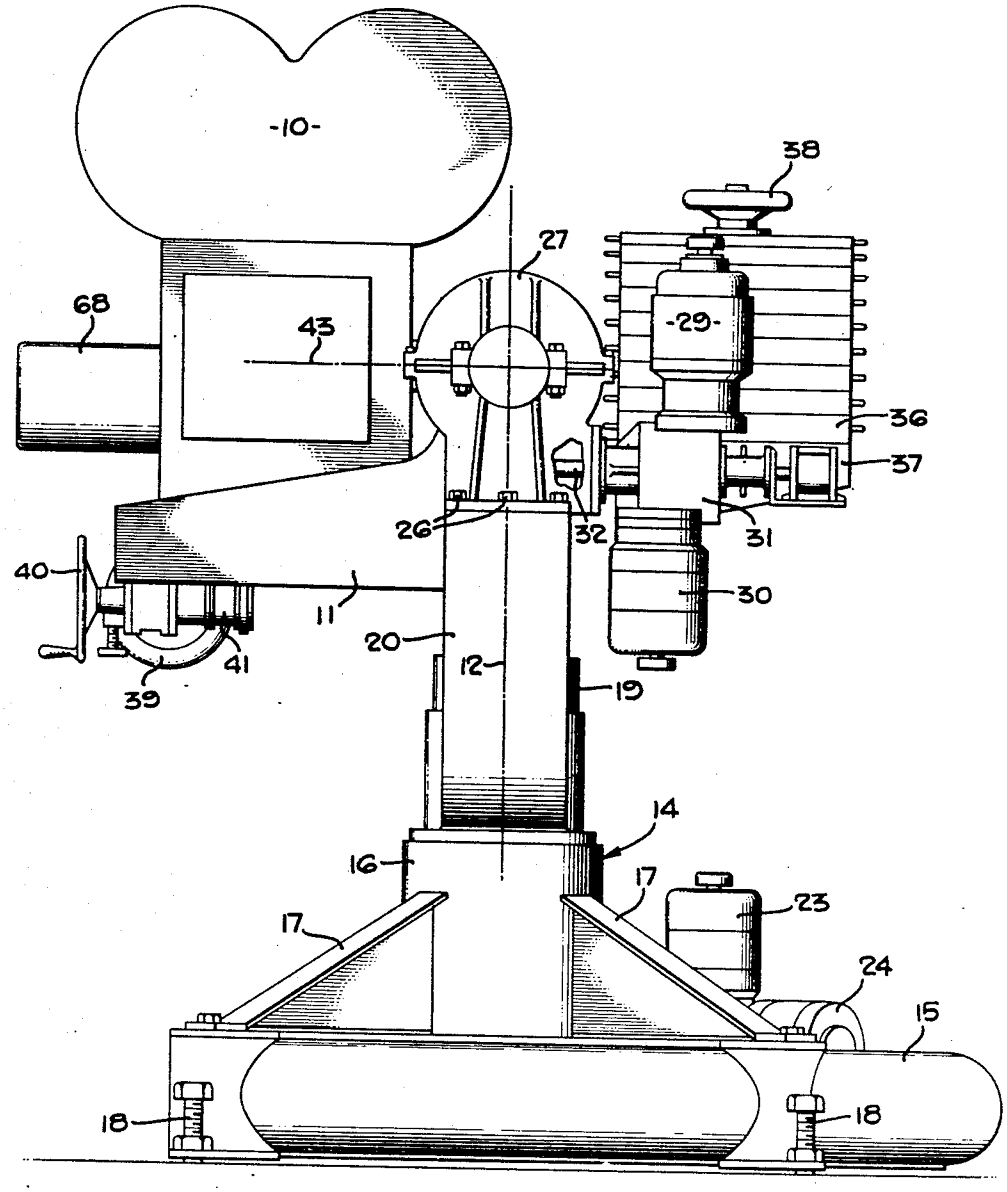
Figure 1 is a side elevation showing a preferred form of pan and tilt apparatus used in connection with out invention.
Figure 2:
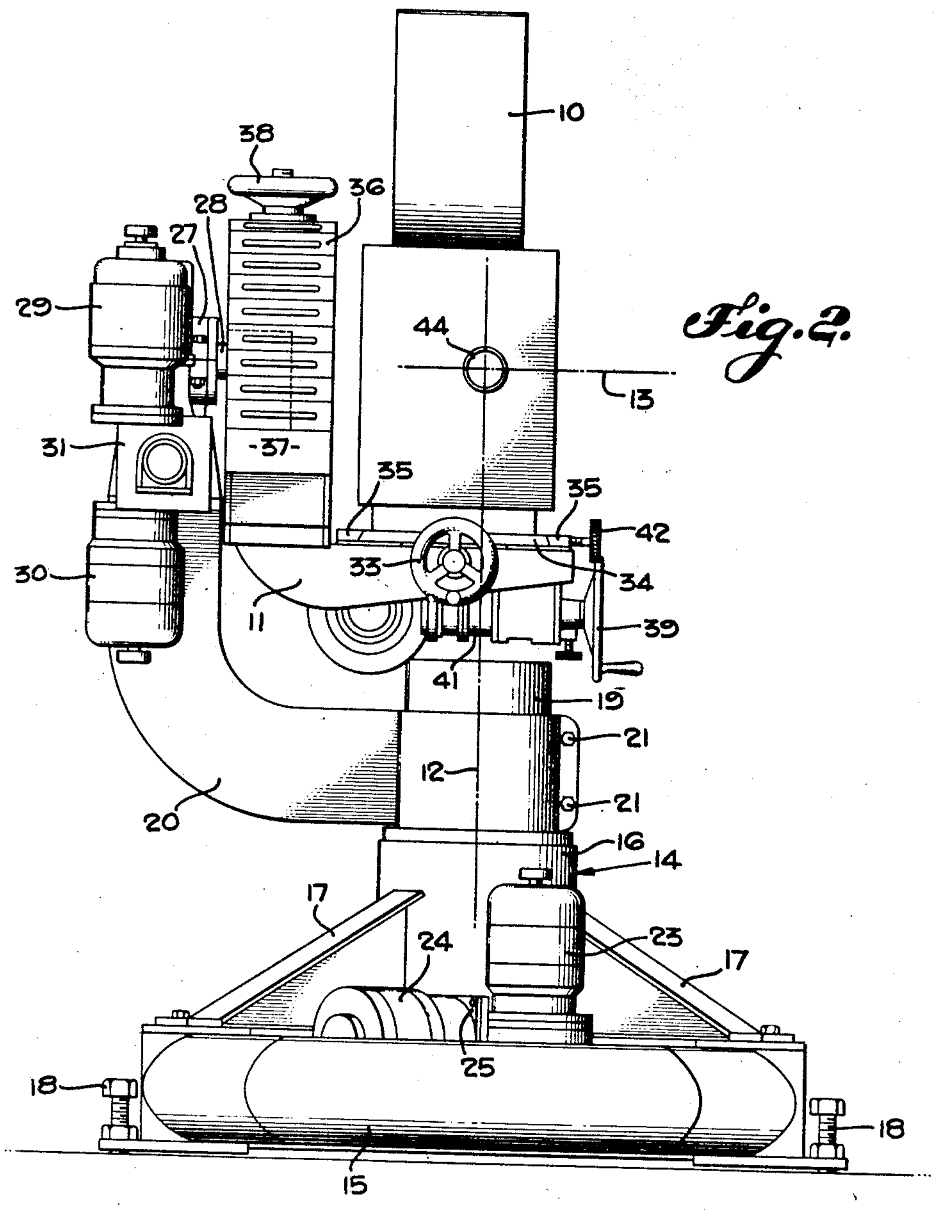
Figure 2 is an end elevation thereof.
Figure 3:
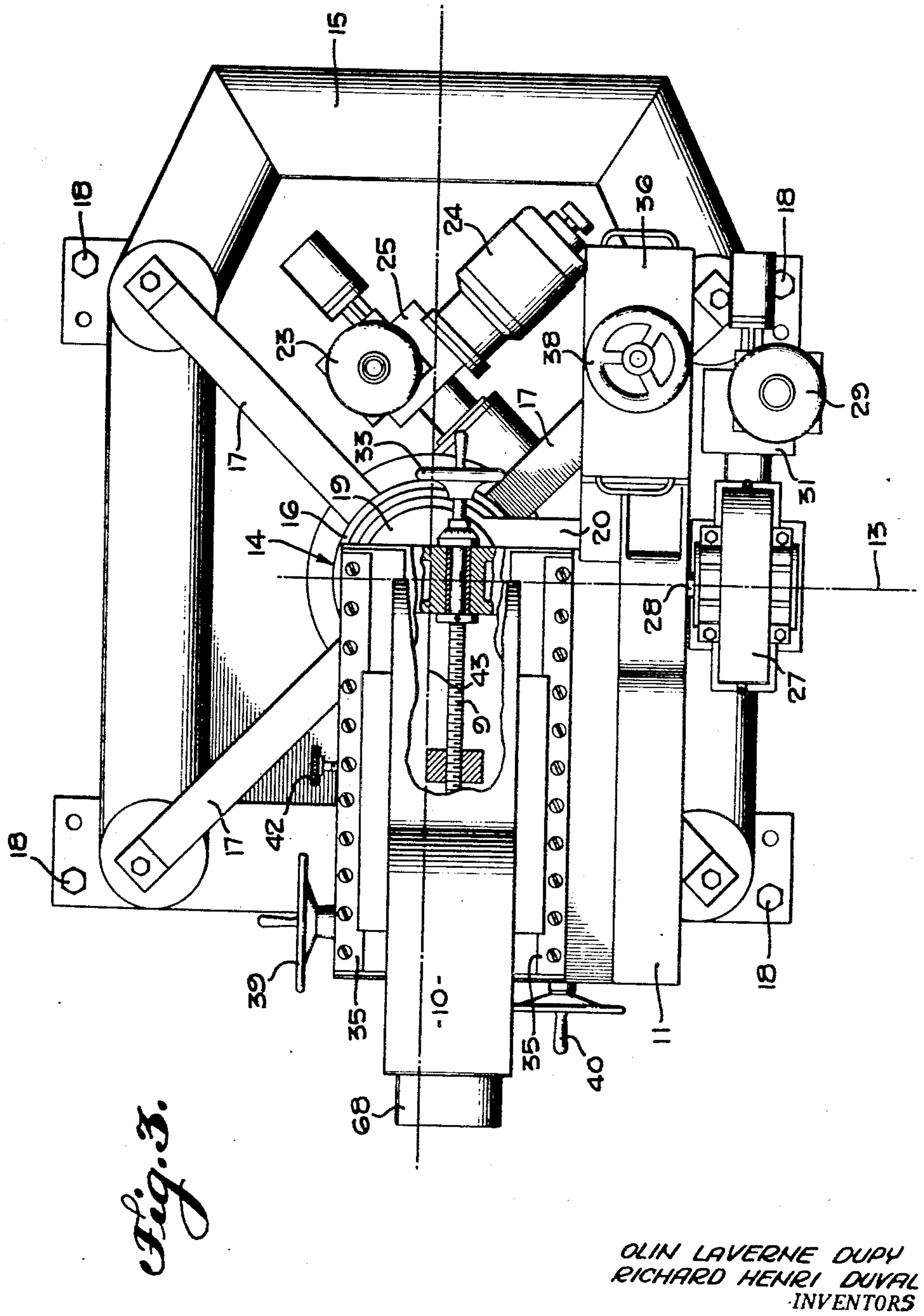
Figure 3 is a top plan view.

In brief, the preferred form of apparatus shown in the drawings and the methods illustrated by the diagrams relate to the production of a motion picture film, each of the frames of which comprise composite photographs made of two or more images photographed at different times while the camera is moved about a pan or tilt axis, or both, the separate images on the film being in substantially exact registry. Such a motion picture film may be produced, for example, by first photographing a distant shot and later photographing on the same film a close-up painting or miniature, or the like, the two shots being made while the camera follows the same sequence of movements synchronized with the film movement. The distant shot may be taken of any desired subject matter such as, for example, actors performing their prescribed roles, while the subsequent close-up shot, with the camera also in motion, may fill in background not actually present on the set with the actors.

In carrying out our invention, we prefer to mount a motion picture camera 10 of any suitable or desirable type upon a carriage 11 which is supported for turning movement about a pair of mutually perpendicular intersecting axes 12 and 13. The axis 12 is referred to hereinafter as the pan axis and the axis 13 is referred to as the tilting axis. A matt (not shown) of any convenient or desirable shape may be mounted in front of the camera lens so that only a desired portion of each film frame is exposed during any one moving shot.

We prefer to provide a relatively stiff supporting base structure generally indicated at 14 which includes a footing 15, an upright hollow post 16, and inclined braces or gussets 17 connecting the footing 15 to the post 16. Leveling screws 18 may be provided on the footing 15 for maintaining the post 16 in vertical position. A vertical trunnion 19 is rotatably mounted in spaced bearings (not shown) carried on the hollow post 16. A support arm 20 is clamped to this vertical trunnion 19 by means of bolts 21. Means are provided for turning the trunnion 19 relative to the base structure 14, and as shown in the drawings this means includes a pair of electric motors 23 and 24 driving into a common differential housing 25. The motors drive a differential mechanism described hereinafter in such a manner as to control the turning movement of the trunnion 19. When the motors 23 and 24 rotate at equal speeds in opposite directions the effect is such as to maintain the trunnion 19 stationary. When one motor is caused to rotate faster than the other, the trunnion turns in one direction, while if said motor is caused to rotate slower than the other the trunnion rotates in the other direction.

Fixed to the support arm 20 by means of bolts 26 is a reduction gear unit 27. This unit may be of any suitable or desirable form but preferably is of the worm and wheel type in order to secure a relatively large gear ratio in a single-stage reduction. The slow speed shaft 28 extending from said reduction gear unit 27 is fixed to the carriage 11 so that turning movement of the shaft 28 causes the carriage 11 to tilt about the axis 13 which is the axis of the shaft 28. Means are provided for turning the input shaft 32 to the gear reduction unit 27, and as shown in the drawings this means includes a second pair of electric motors 29 and 30 driving into a common differential housing 31. The motors operate in a manner similar to the manner described in connection with motors 23 and 24. Thus, when the motors 29 and 30 rotate at equal speeds in opposite directions, the input shaft 32 to the gear reduction unit 27 is caused to remain stationary. When one of the motors is speeded up, the shaft 32 rotates in one direction, and when that motor is slowed down the shaft rotates in the other direction.

Means are provided on the carriage 11 for adjusting the position of the camera 10 in a direction at right angles to both of the axes 12 and 13. As shown in the drawings, this means includes a hand wheel 33 arranged to drive a lead screw 9 for moving the sliding camera support 34 along the parallel ways 35. The camera 10 is suitably attached to the sliding camera support 34 by any convenient means (not shown). A clamp screw 42 is provided for locking the sliding support 34 with respect to the carriage 11. The camera 10 is so positioned on the sliding support 34 and carriage 11 that the optical axis 43 of the camera lens system 44 intersects the mutually perpendicular pan axis 12 and tilt axis 13. Since the camera 10 may be relatively large and heavy, it is desirable to provide a counterbalance to offset the weight of the camera 10 and carriage 11 and therefore reduce the amount of work required to be performed by the motors 29 and 30. As shown in the drawings the counterbalance may take the form of a plurality of weights 36 stacked on an arm 37 extending from the carriage 11 on the opposite side of the axis 13 from the location of the camera 10. The weights may be clamped in place by means of a screw and nut assembly 38.

Readily accessible control means are provided for governing the action of the pair of pan motors 23 and 24 and for governing the action of the pair of tilt motors 29 and 30. As shown in the drawings, the hand wheel 39 is provided for regulating the pan motors and the hand wheel 40 is arranged to control the operation of the tilt motors. Each of the hand wheels is connected to drive a frequency changer 41. The electrical and mechanical connections whereby the frequency changers 41 control the operation of the tilt motors and pan motors is set forth in detail hereinafter.

From the above description it will be understood that the camera 10 can be caused to tilt about the axis 13 by rotation of the hand wheel 40. The direction and speed of turning of the hand wheel 40 controls the direction and angular speed of tilting of the camera 10. Similarly, panning movement of the camera 10 about the axis 12 is caused by rotation of the hand wheel 39. The direction and speed of rotation of the hand wheel 39 governs the direction of panning movement of the camera 10 and the angular speed thereof.

Figure 4:
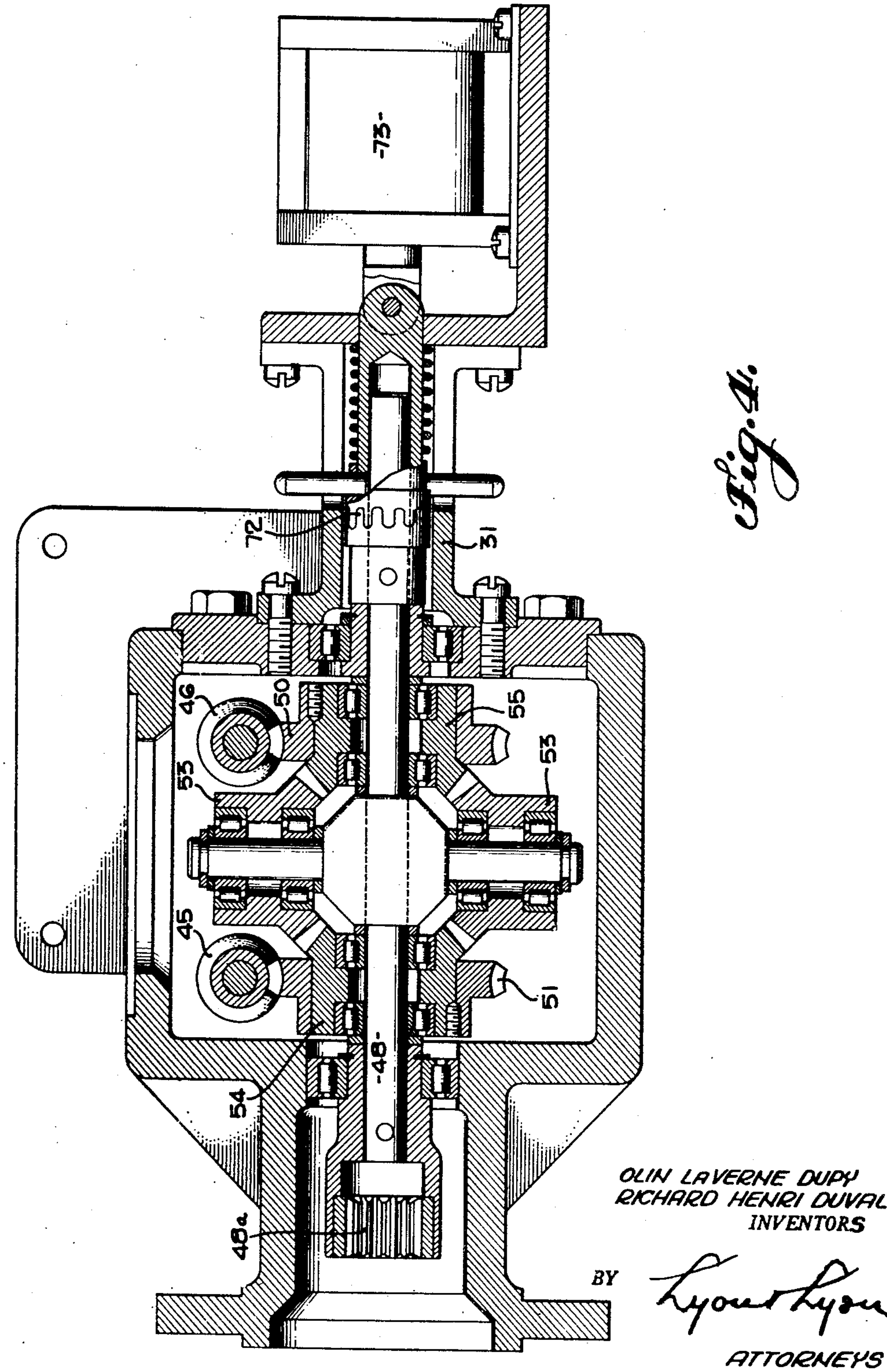
Figure 4 is a sectional view showing details of construction of one form of differential mechanism employed in connection with our invention.
Figure 5:
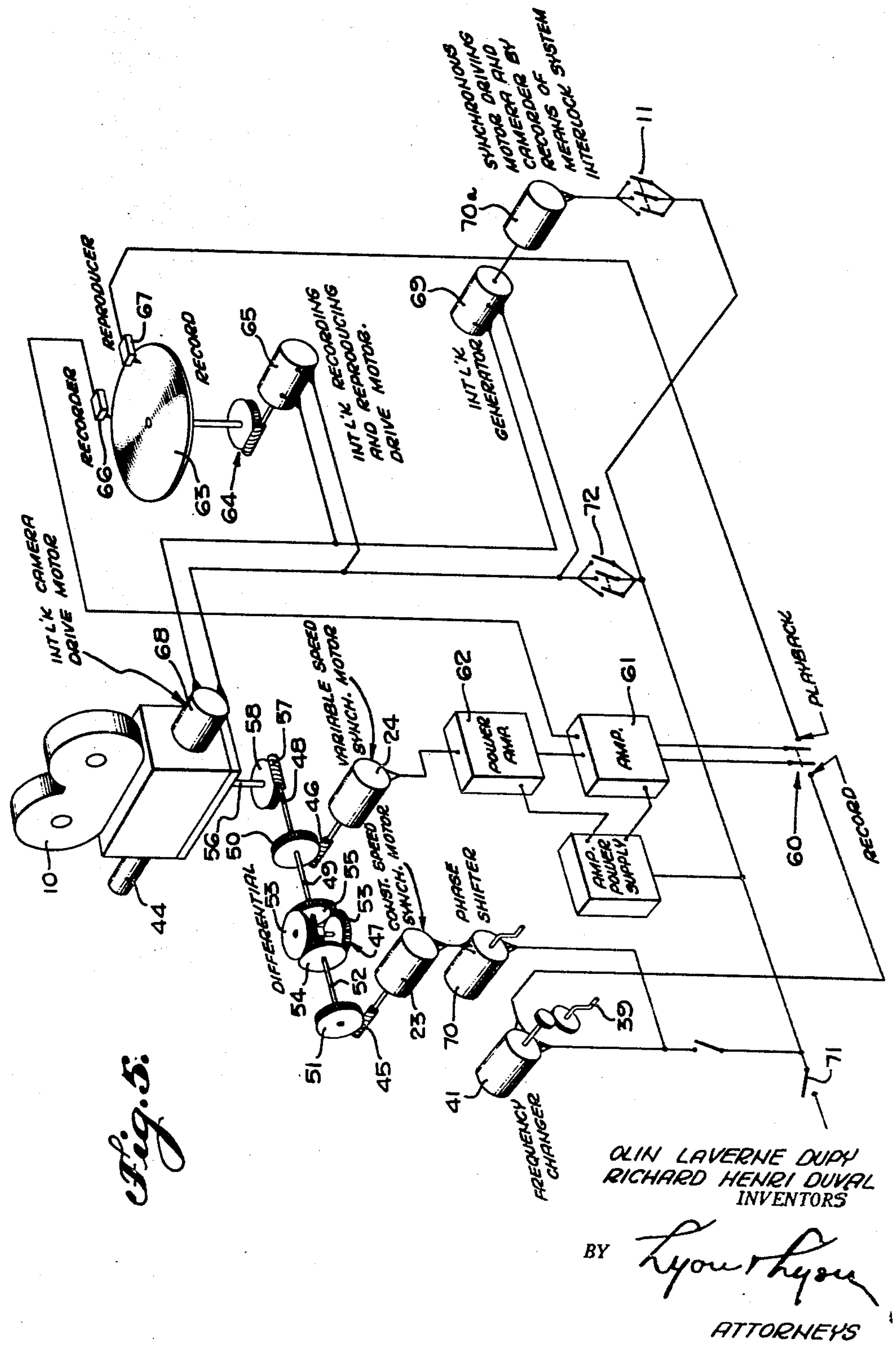
Figure 5 is a schematic diagram showing the essential features of the electrical hook-up and the differential drive mechanism for panning the camera.

Figure 5 shows a preferred form of electrical hook-up in schematic fashion and illustrates a single pair of motors driving a differential mechanism for turning the camera 10 about one axis. The mechanism and electrical hook-up for turning the camera about another axis has not been shown in the drawings, since it involves only a duplication of parts. In the interest of clarity of illustration only one pair of motors and differential drive therefor has been shown. It will be assumed for the purposes of this specification that the differential mechanism 47 connecting the motors is the one enclosed within the differential housing 25. As shown in Figures 1, 2, 3 and 5, the motor 23 is of synchronous type and drives the worm pinion 45 (in Figure 5) at constant speed. The motor 24 is also synchronous but the frequency supplied to it may be varied as described hereinafter so that the worm pinion 46 may be driven at a variable speed. The motors 23 and 24 rotate in opposite directions, and when the worm pinions 45 and 46 are turning at the same speed the differential mechanism 47 maintains the output shaft 48 in a stationary position. The differential mechanism 47 may take any suitable or desirable form. The schematic view in Figure 5 shows a sleeve 49 connected to the worm wheel 50 which is driven by the worm pinion 46. The sleeve encircles the output shaft 48. The worm wheel 51 which is driven by the worm pinion 45 is connected to an input shaft 52. Planetary gears 53 fixed on a spider secured to the output shaft 48 mesh with the driving gear 54 on the shaft 52 and the driving gear 55 fixed on the sleeve 49. The shaft 52 and sleeve 49 constitute the power input members, while the shaft 48 represents the output member. The camera 10 is turned about the axis of the shaft 56 by means of the worm pinion 57 which drives the worm gear 58. The differential drive mechanism 47 may also take the specific form shown in Figure 4, the operation of which is set forth in detail hereinafter. In any case, two of the three elements of a differential mechanism are driven in opposite directions by individual motors, while the third element is connected to cause pivotal movement of the camera 10.

An induction frequency changer 41 is electrically connected to a power supply and also to a switch assembly 60. The switch assembly has terminals electrically connected to the variable speed synchronous motor 24 through amplifiers 61 and 62. When the switch 60 is closed the synchronous motor 24 rotates at a speed equal and opposite to that of the motor 23. When the frequency changer 41 is turned by means of the crank 39 the motor 24 is caused to increase or decrease its speed, depending on the direction of rotation of the crank 39. The resulting change in rotation of the worm pinion 46, worm gear 50, sleeve 49 and gear 55 is such that the shaft 48 rotates by differential action to turn the camera 10 in one direction about the axis of the shaft 56. If the crank 39 is turned in the other direction the camera 10 likewise pivots in the other direction. Accordingly, the pivotal movement of the camera 10 is controlled accurately by means of the crank 39. When the crank is stationary the camera 10 is likewise stationary. The rate and direction of rotation of the crank 39 is directly reflected in the rate and direction of angular movement of the camera 10.

If desired, the motors 23 and 24 and the differential mechanism 47 may be replaced by a single differential motor having two field windings and a single armature, as will be readily understood by those skilled in the art. In such case the output shaft 48 driven by the armature of such differential motor turns in a direction and speed controlled by the differential motion of the field produced by the two field windings. One of the windings is supplied with power through the frequency changer 41 and the other is connected directly to the power supply line.

In accordance with our invention, means are provided for automatically producing an accurate record of the panning movement of the camera 10 as it makes the first of two or more moving shots which are photographed on the same film. This recording means may take any suitable or desirable form, and as shown in the drawings many include a phonograph-type disk record 63 driven through gearing 64 from a drive motor 65. A recorder cutting head 66 is provided for cutting a record groove and a reproducer tone arm 67 is provided for playback purposes. While we have shown in Figure 5 a single recorder and single reproducer, it will be understood that when the camera is mounted for both pan and tilt movements two independent record grooves are formed on the same record 63 or on synchronized separate records, thus requiring two recorder arms and two reproducer arms. Cutting of the record grooves for controlling movement about two separate axes is preferably done on a single disk in order that the two records may be permanently interlocked.

When the first of two or more shots is made the camera drive motor 68 and the drive motor 65 for the recording mechanism are both driven from a common interlocking generator 69 so that the motors 65 and 68 rotate at exactly the same speed in interlocked relationship. The generator 69 may conveniently be driven by a sychronous motor 70a connected to the power supply. As the film progresses through the motion picture camera 10 the record 63 is turned at a proportional rate of speed. When the crank 39 is turned to cause pivotal movement of the camera 10 the frequency supplied to the synchronous motor 24 to effect such camera movement is recorded by the recorder 66 on the record 63. The turning movement of the camera my be nonuniform, may proceed in one direction at one rate and then in another direction at another rate, or in any manner to produce the desired sequence of motion. The pivotal movements of the camera can then be duplicated exactly frame for frame by rewinding the film, orienting the camera in the original position, engaging the reproducer 67 with the groove just cut by the recorder 66 and moving switch 60 from recording position to playback position. Closing switch 11 brings motors 65 and 68 up to speed in synchronism, and while the reproducer is still picking up the recorded power-line frequency phase shifter 70 is turned so that motors 23, 24, 65 and 68 are synchronized in the same phase relation that existed during the original moving shot.

The frequency picked up by the reproducer 67 from the groove formerly cut by the recorder then passes through the amplifiers 61 and 62 so that the speed of the synchronous motor 24 is varied in precisely the same manner and sequence as occurred during the taking of the initial moving shot. Accordingly, as the record 63 turns, the camera 10 pivots in the same manner and sequence frame for frame as it did during the initial moving shot. The record 63 may be used again and again so that the camera may be caused to progress through its predetermined path in precisely the same sequence of motions. In this way several different exposures can be made on the same film so that on each frame is photographed a composite picture made of several matching images.

In the particular differential mechanism shown in Figure 4, one of the driving motors turns the worm wheel 50 in one direction and the other motor turns the worm wheel 51 in the other direction. A central spider rotatably supports the gears 53 which mesh with the driving gears 54 and 55 which are fixed to the worm wheels 51 and 50 respectively. The spider is connected to the output shaft 48 which may be connected to a spline coupling 48a to drive the reduction gear unit 27.

Means may be provided for maintaining the output shaft 48 stationary, and as shown this means may include the clutch 72 which may be used to connect the shaft 48 to the differential housing 31. A solenoid 73 may be used for actuating the clutch 72 as desired.

Figure 6:
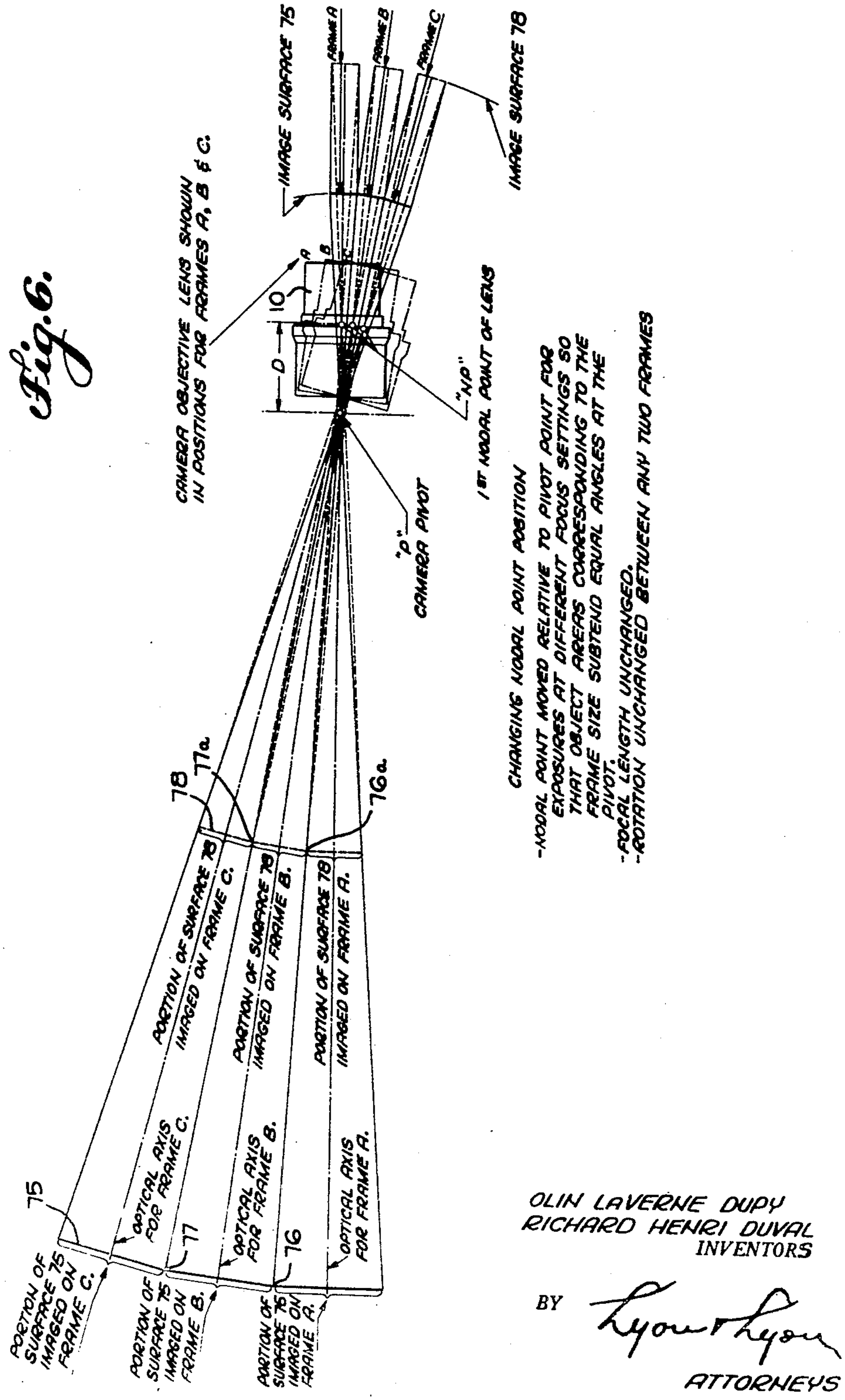
Figure 6 is a diagram illustrating a preferred method of manipulating the motion picture camera with respect to the pan and tilt axes for making motion picture shots at separate times and photographed on the same film.

In Figure 6 we have shown a preferred method which embodies our invention and which shows diagrammatically how we photograph long and short shots on the same film at different times while the camera is panned and/or tilted in exactly the same sequence of motions for both shots. Figure 6 shows only pivotal motion about one axis for clarity of illustration, but the same principles apply for pivotal movement about either the pan or tilt axis, or both. For the first shot, which may be the distant shot, the focusing mechanism of the camera 10 is set for the distance from the camera pivot axis P to the first object surface 75. The camera 10 is positioned on a carrier so that the first nodal point NP is positioned at or near the pivotal axis P. While the camera motor is moving the film therein at synchronous speed, the camera 10 is pivoted about the axis P to photograph the object surface 75. In the diagram three frames A, B and C are chosen on which three adjacent portions of the object surface 75 are imaged, that is, the point 76 would be imaged on the nearest adjacent edges of the frames A and B, and similarly, the point 77 would be imaged on the nearest adjacent edges of frames B and C on the strip of film in the camera. It is desired to photograph on the same strip of film but at a later time object surface 78 which is at a different distance from the pivotal axis P. It is required that there shall be no relative motion between images of fixed points on object surfaces 75 and 78 from frame to frame on the camera film. While photographing object surface 78, it is assumed that the camera will have the same angular position for each frame exposure that it had when photographing object surface 75.

In accordance with our invention, the camera 10 is moved relative to the carriage after the first distant shot has been made. The camera is moved along its optical axis in a direction away from the object surface 75 for a distance D, and the focusing mechanism is reset on the object surface 78. The amount of movement D is such that the portions of object surface 78 imaged on the original frames A, B and C are joined. In other words, the distance D is such that the areas of surfaces 75 and 78 conjugate to a frame subtend the same solid angle at the pivot axis P. The image of point 76a will coincide with the image of point 76, and the image of point 77a will coincide with the image of point 77 on frames A and B, and also on all intervening frames exposed during pivotal motion of the camera 10.

While we have described our invention so that the distant shot is first made, it is obvious that the particular sequence in which the shooting takes place is immaterial. The distance D may be determined in any suitable manner, as for example experimentally, and varies for different lens systems and the distances involved.

In a preferred method of determining the distance D experimentally, the camera is directed at object surface 75, and a first test shot is made, exposing one frame of film. The camera is then pivoted about one axis and a second test shot is made, exposing a second frame of film. Both frames of film are developed, and the camera is used as a projector (which is accomplished by removing the advancing mechanism, substituting a dummy mechanism, and using a mirror so that light may be shined through the developed film against a screen or other surface) to project the first frame on object surface 78, which may be a miniature scene painted on a flat surface, so that like objects on surface 78 and on the projected frame "line up." The camera is then pivoted exactly as it was pivoted between the exposure of the first frame of film and the second frame of film, by means of the recording and reproducing mechanism described herein, and the second frame is projected onto object surface 78. The sliding support 34 is moved by means of the hand wheel 23 to reduce the displacement between like objects on the miniature and on the projected frame. At some point in the travel of the sliding support 34, depending upon the particular lens system and the distances involved, like objects on surface 78 and on the projected frame will "line up" with no apparent displacement therebetween. The distance through which the sliding support 34 is moved will be the distance D.

As described above, when making the production shots, a record is made of the frequency supplied to one of the differential motors at the time the first shot is made. The pivotal motion of the camera is controlled by this record during the second shot so that the camera 10 has the same angular position for each frame exposure that it had when the first moving shot was made. Since the movement of the camera for the distance D takes place along the optical axis of the camera and at right angles to both the pan axis and tilt axis, the camera lens is moved the same distance from both of these axes. Accordingly, once the distance D has been established the camera may be pivoted about either the pan axis or the tilt axis in producing the composite moving shot.

Figure 7:
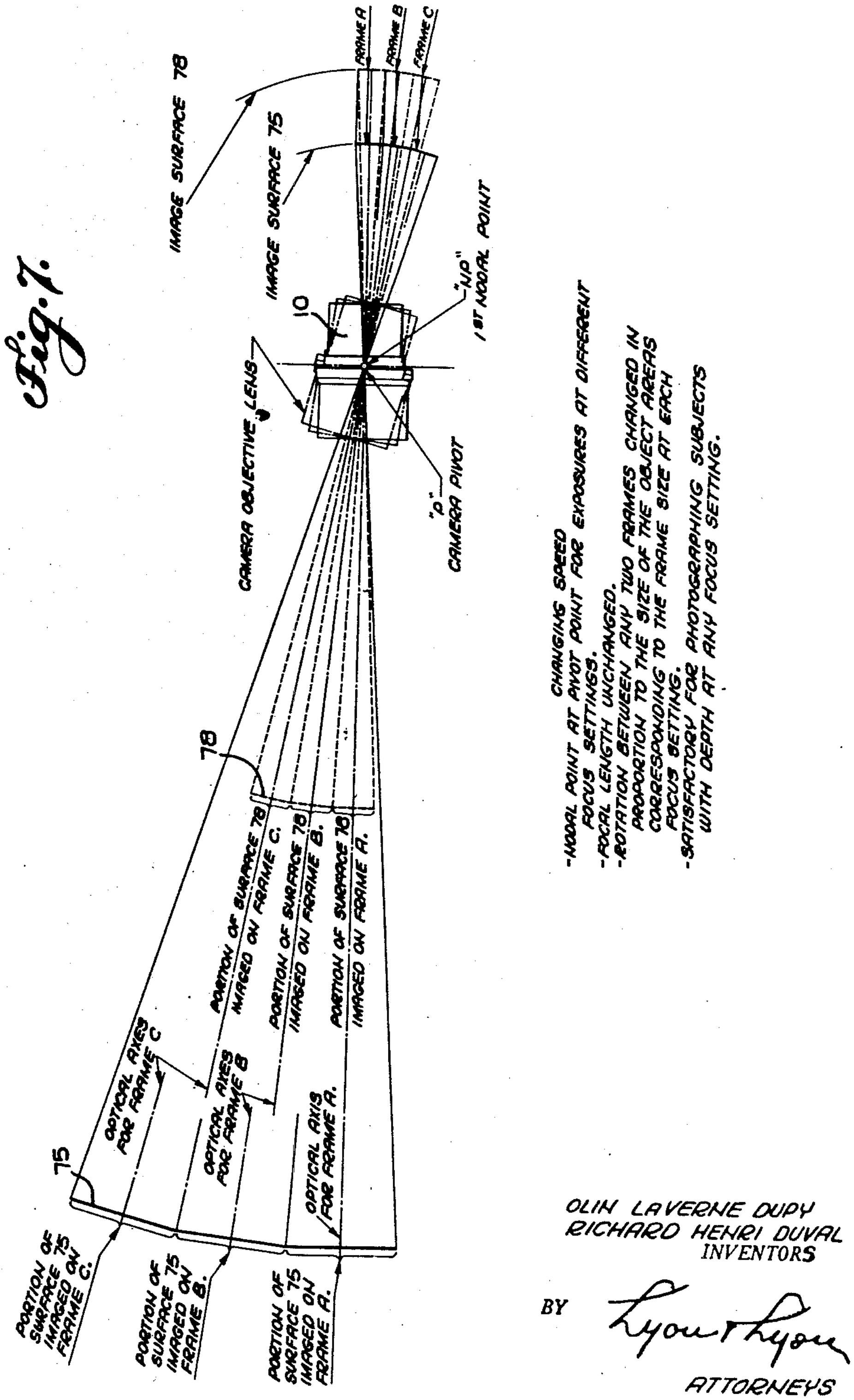
Figure 7 is a diagram illustrating a modified form of our preferred method.

A modified form of the method shown in the diagram of Figure 6 is illustrated in Figure 7. Figure 7 shows an alternate method of photographing on the same piece of film object surfaces 75 and 78 at different distances from the pivot axis of the camera 10. As shown in Figure 6 it is required that there shall be no relative movement between images of fixed points on surfaces 75 and 78 from frame to frame. In the method illustrated in Figure 7 the camera 10 is not moved on its supporting carriage between the first and second moving shots, but instead the desired result is achieved by changing the angular speed of pivotal movement of the camera 10 in proportion to the size of the object areas corresponding to the frame size at each focus setting. The angular speed of rotation is changed for different focus settings. The speed change may readily be accomplished by changing a pair of gears in the differential mechanisms driven by the pairs of motors 23 and 24 or 29 and 30. As an example, if the portion of the object surface 78, corresponding to a frame, is one-half the size of the portion of object surface 75, corresponding to a frame, the differential gearing for the moving shot of object surface 78 may be changed so that the rate of angular movement of the camera is one-half as great as it was during the operation of photographing the object surface 75. When employing the method shown in Figure 7 in photographing objects with depth on the first and/or succeeding exposures, the camera must be positioned so that the nodal point NP coincides substantially with the pivot axis P of the camera 10 to avoid relative movement, on the film from frame to frame, of the images of fixed objects.

Figure 8:
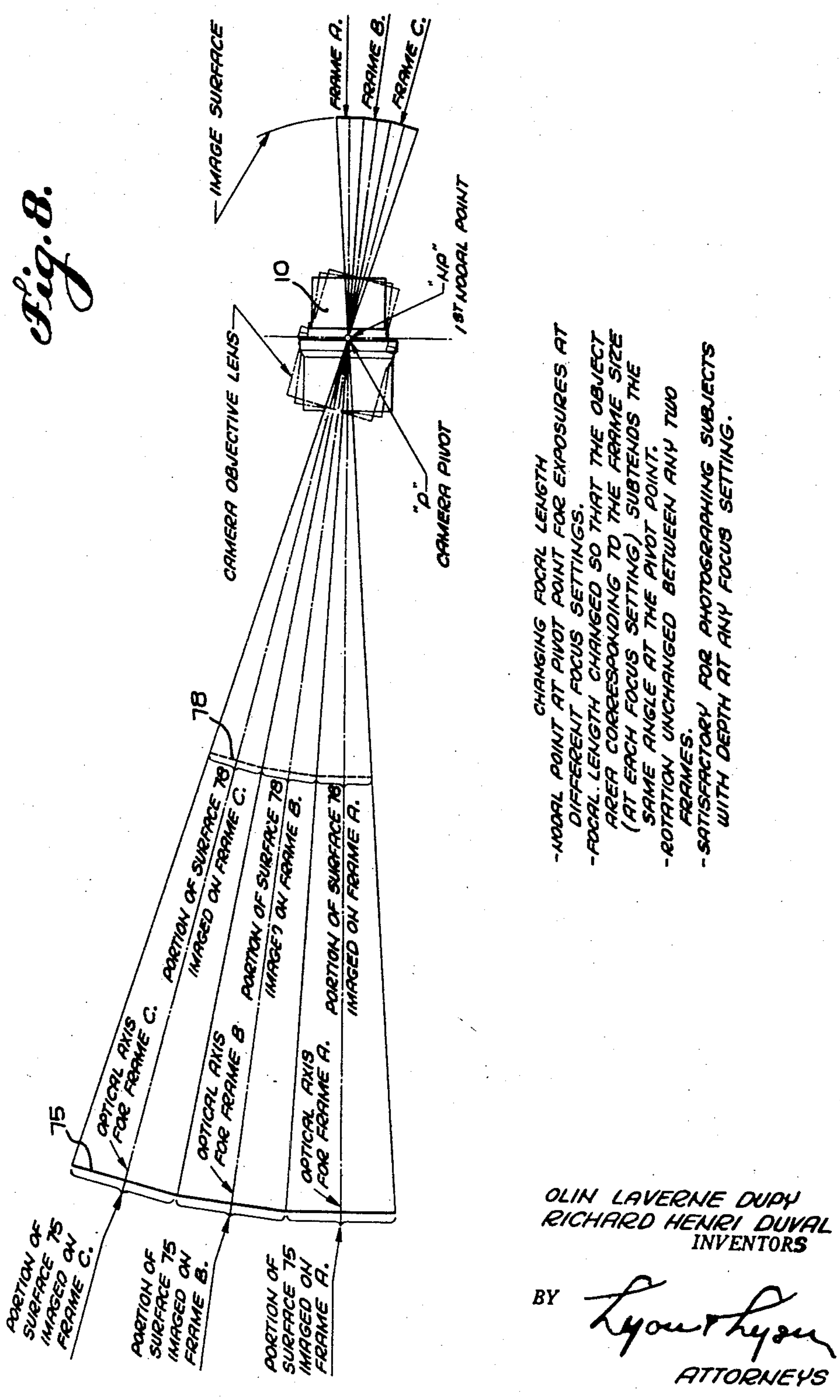
Figure 8 is a similar diagram showing a further modification.

In the modification shown in Figure 8, we also mount the camera 10 so that the first nodal point of the lens system is substantially at the pivotal axis P. In this form of our method, different focal length lenses are used for making the shots of the object surface 75 and the object surface 78. The camera is not shifted on its supporting carriage between the first and second moving shots. No relative movement between images of fixed points on the surfaces 75 and 78 occurs from frame to frame because a separate camera lens or lens system is employed for each of the object surfaces. This modified form of our method is the least practical for ordinary work because it requires a different focal length lens for each focal setting, and since these lenses must be accurately mounted on a given camera and are not interchangeable between cameras, only those cameras so equipped can be used. However, we have found that for a particular set-up involving only one change of focus setting this modified form of our method may have economic advantages, particularly in instances where speed change gears, together with the desired ratio, cannot be conveniently incorporated into the differential housing or where the camera must be moved so far back from the pivot axis that structural problems arise in supporting the camera with sufficient rigidity.

While we have shown and described our method and apparatus in connection with photographing more than one moving shot on a film, it is to be understood that the method and apparatus may also be employed when more than one film is used. The several exposures with the camera in motion can each be photographed on a separate film if desired, and the desired composite film can then be made from the individual films.

This is a continuation-in-part of our copending application, Serial No. 111,644, filed August 22, 1949, for "Method and Apparatus for Duplicating Motion Picture Shots," which was abandoned subsequent to the filing of this application.

Having fully described our invention, it is to be understood that we do not wish to be limited to the details herein set forth, but our invention is of the full scope of the appended claims.

We claim:

1. In a device for duplicating the panning and tilting motions of a motion picture camera, the combination of: a motion picture camera, a support carriage for said motion picture camera, means for permitting the support carriage to be panned and tilted, first drive means for panning the carriage, second drive means for tilting the carriage, each of the drive means including an electrically driven differential device, each differential device including a power output element turning in either direction and at a variable speed in response to forces exerted by a first means electrically energized at a fixed frequency and by a second means electrically energized at a variable frequency.

2. In a device for duplicating the panning and tilting motions of a motion picture camera, the combination of: a motion picture camera, a support carriage for said motion picture camera, means for permitting the support carriage to be panned and tilted, first drive means for panning the carriage, second drive means for tilting the carriage, each of the drive means including an electrically driven differential device, each differential device including a power output element turning in either direction and at a variable speed in response to forces exerted by a first means electrically energized at a fixed frequency and by a second means electrically energized at a variable frequency, and means to record the variable frequency of each of said second means in said differentials to enable duplication of the path of movement of the camera.

3. In a device for duplicating the panning and tilting motions of a motion picture camera, the combination of: a motion picture camera, a support carriage for said motion picture camera, means for permitting the support carriage to be panned and tilted, first drive means for panning the carriage, second drive means for tilting the carriage, each of the drive means including an electrically driven differential device, each differential device including a power output element turning in either direction and at a variable speed in response to forces exerted by a first means electrically energized at a fixed frequency and by a second means electrically energized at a variable frequency, and means to record on a single record the variable frequency of each of said second means in said differentials to enable duplication of the path of movement of the camera.

4. In a device for duplicating motion picture shots to produce composite photographs on each film frame, the combination of: a motion picture camera provided with a lens system having an optical axis, a support carriage for said camera, means for swinging the support carriage about two mutually perpendicular intersecting axes, the camera being mounted on the support carriage so that said optical axis may assume a position mutually perpendicular to said other axes, first drive means for swinging the carriage about one of the said intersecting axes, second drive means for swinging the carriage about the other of said intersecting axes, each of the drive means including an electrically driven differential device, each differential device including a power output element turning in either direction and at variable speed in response to forces exerted by a first means electrically energized at a fixed frequency and by a second means electrically energized at a variable frequency.

5. In a device for duplicating motion picture shots to produce composite photographs on each film frame, the combination of: a motion picture camera provided with a lens system having an optical axis, a support carriage for said camera, means for swinging the support carriage about two mutually perpendicular intersecting axes, the camera being mounted on the support carriage so that said optical axis may assume a position mutually perpendicular to said other axes, first drive means for swinging the carriage about one of the said intersecting axes, second drive means for swinging the carriage about the other of said intersecting axes, each of the drive means including an electrically driven differential device, each differential device including a power output element turning in either direction and at variable speed in response to forces exerted by a first means electrically energized at a fixed frequency and by second means electrically energized at a variable frequency, and means to record on a single record the variable frequency of each of said second means in said differentials to enable duplication of the path of movement of the camera.

6. In a device for duplicating motion picture shots to produce composite photographs on each film frame, the combination of: a motion picture camera provided with a lens system having an optical axis, a support carriage for said camera, means for swinging the support carriage about two mutually perpendicular intersecting axes, the camera being mounted on the support carriage so that said optical axis may assume a position mutually perpendicular to said other axes, means including a control element for moving the camera on the support carriage along said optical axis, means for securing the camera in adjusted position on the support carriage, first drive means for swinging the carriage about one of the said intersecting axes, second drive means for swinging the carriage about the other of said intersecting axes, each of the drive means including an electrically driven differential device, each differential device including a power output element turning in either direction and at variable speed in response to forces exerted by a first means electrically energized at a fixed frequency and by a second means electrically energized at a variable frequency.

7. In a device for duplicating motion picture shots to produce composite photographs on each film frame, the combination of: a motion picture camera provided with a lens system having an optical axis, a support carriage for said camera, means for swinging the support carriage about two mutually perpendicular intersecting axes, the camera being mounted on the support carriage so that said optical axis may assume a position mutually perpendicular to said other axes, means including a control element for moving the camera on the support carriage along said optical axis, means for securing the camera in adjusted position on the support carriage, first drive means for swinging the carriage about one of the said intersecting axes, second drive means for swinging the carriage about the other of said intersecting axes, each of the drive means including an electrically driven differential device, each differential device including a power output element turning in either direction and at variable speed in response to forces exerted by a first means electrically energized at a fixed frequency and by second means electrically energized at a variable frequency, and means to record on a single record the variable frequency of each of said second means in said differentials to enable duplication of the path of movement of the camera.

References Cited in the file of this patent

UNITED STATES PATENTS

| Number | Name | Date |
|---|---|---|
| 1,497,512 | Kaminski | June 10, 1924 |
| 1,576,854 | Seitz | Mar. 16, 1926 |
| 1,840,669 | Handschiegl | Jan. 12, 1932 |
| 1,971,486 | Jennings et al. | Aug. 28, 1934 |
| 2,064,206 | Jackman | Dec. 15, 1936 |
| 2,210,454 | Harvey | Aug. 6, 1940 |
| 2,293,207 | Haskin et al. | Aug. 18, 1942 |
| 2,364,363 | Howell | Dec. 5, 1944 |
| 2,475,245 | Leaver et al. | July 5, 1949 |

FOREIGN PATENTS

| Number | Country | Date |
|---|---|---|
| 653,913 | Germany | Dec. 6, 1937 |